United States Patent
Qadri et al.

(10) Patent No.: US 8,883,326 B2
(45) Date of Patent: Nov. 11, 2014

(54) MONOCLINIC INDIA STABILIZED GADOLINIA

(71) Applicants: Syed B Qadri, Fairfax Station, VA (US); Guillermo R. Villalobos, Springfield, VA (US); Jasbinder S. Sanghera, Ashburn, VA (US)

(72) Inventors: Syed B Qadri, Fairfax Station, VA (US); Guillermo R. Villalobos, Springfield, VA (US); Jasbinder S. Sanghera, Ashburn, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/800,479

(22) Filed: Mar. 13, 2013

(65) Prior Publication Data
US 2013/0306899 A1 Nov. 21, 2013

Related U.S. Application Data

(60) Provisional application No. 61/647,865, filed on May 16, 2012.

(51) Int. Cl.
| | |
|---|---|
| *B32B 9/00* | (2006.01) |
| *B32B 19/00* | (2006.01) |
| *C04B 35/50* | (2006.01) |
| *C04B 35/622* | (2006.01) |
| *C04B 35/64* | (2006.01) |
| *C04B 35/01* | (2006.01) |
| *C04B 35/626* | (2006.01) |
| *C04B 35/628* | (2006.01) |
| *C04B 35/645* | (2006.01) |

(52) U.S. Cl.
CPC ........... *C04B 35/50* (2013.01); *C04B 35/62222* (2013.01); *C04B 35/64* (2013.01); *C04B 35/622* (2013.01); *C04B 35/01* (2013.01); *C04B 35/62655* (2013.01); *C04B 35/62805* (2013.01); *C04B 35/62884* (2013.01); *C04B 35/62886* (2013.01); *C04B 35/645* (2013.01); *C04B 35/6455* (2013.01); *C04B 2235/3203* (2013.01); *C04B 2235/3224* (2013.01); *C04B 2235/3286* (2013.01); *C04B 2235/444* (2013.01); *C04B 2235/445* (2013.01); *C04B 2235/604* (2013.01); *C04B 2235/76* (2013.01); *C04B 2235/762* (2013.01); *C04B 2235/767* (2013.01); *C04B 2235/77* (2013.01); *C04B 2235/785* (2013.01); *C04B 2235/786* (2013.01); *Y10S 428/917* (2013.01)
USPC .......................................... 428/690; 428/917

(58) Field of Classification Search
CPC ........ H05B 33/20; H05B 33/10; H05B 33/14; H05B 33/22; H05B 33/26; H01L 2251/5315
USPC ......... 313/502, 503, 504, 505, 506, 507, 508, 313/509; 428/472, 690, 917, 411.1, 336
See application file for complete search history.

(56) References Cited

U.S. PATENT DOCUMENTS

2006/0234088 A1* 10/2006 Inoue et al. .................... 428/702
2010/0282604 A1* 11/2010 Inoue et al. .............. 204/298.13

OTHER PUBLICATIONS

H. Chen, C. He, C. Gao, J. Zhang et al., Phys. Lett. 24, 158 (2007).
Zou, Xu et al., physica status solidi (b) vol. 248, p. 1123-1127, issue 5 (May 2011).

\* cited by examiner

*Primary Examiner* — Noah Wiese
(74) *Attorney, Agent, or Firm* — US Naval Research Laboratory; Stephen T. Hunnius

(57) ABSTRACT

A composition comprising india stabilized gadolinia wherein the india stabilized gadolinia is an oxide with a direct substitution of the indium ion for the gadolinia ion resulting in a compound with the formula $In_xGd_{2-x}O_3$.

14 Claims, 2 Drawing Sheets

MONOCLINIC INDIA STABILIZED GADOLINIA

REFERENCE TO RELATED APPLICATION

This application is a non-provisional of, and claims priority to and the benefits of, U.S. Provisional Patent Application 61/647,865 filed on May 16, 2012, the entirety of which is hereby incorporated by reference.

BACKGROUND $Gd_2O_3$ and $In_2O_3$ belong to the class of rare earth sesquioxides ($RE_2O_3$, RE=rare earth).

Recently, there has been significant interest in these materials because of their unique structural, electro-optic and magneto-transport properties.

Their thin films, grown either by techniques such as molecular beam epitaxy, pulsed laser deposition, or magnetron sputtering, have important applications such as in microelectronic, opto-electronic, and optical devices and also may have potential spintronic applications.

The sequioxides when doped with other rare-earth elements and transition metal ions can be used in lasers of different wavelengths and as phosphors.

$Gd_2O_3$ also known as gadolinia has many important applications in optics and applications involving its paramagnetic nature. It is being used as contrasting agent in clinical magnetic resonance imaging (MRI). Functionalized nanoparticles of gadolinia have been used to enhance contrast in MRI and magnetic resonance angiography (MRA).

Gadolinium oxide doped with Al has been proposed as a blocking oxide layer because of its high dielectric constant in charge-type Flash memory cell devices.

Gadolinia is also used in nuclear reactors as control rods and has the advantage of reducing fuel cost and increased fuel management flexibility. It is subjected to extreme conditions of temperature and pressure and could go through phase transitions. If, however, it is synthesized in the high pressure and temperature phase, it will not go through phase changes during the cycles of variable temperature and pressure and thus prolong the durability of these rods and their breakdown.

SUMMARY OF DISCLOSURE

Description

This disclosure concerns (1) synthesis of abundant quantities of the high pressure phases of Gadolinia-India without the application of high pressure, (2) the nanoparticles in abundant quantities in a pure form using an inexpensive processing, (3) the process to densify ceramic articles made from the variously configured particles, and (4) the densified article itself.

This invention further discloses $In_2O_3$ (india) coated $Gd_2O_3$ (gadolinia) particles and agglomerated powders. The powders can be either undoped or doped with one or more transition metal or rare earth elements. The coating can be but need not be hermetic or continuous, but should be sufficient to prevent a large number of sites or any sites where particles contact each other or where no particles contact each other without an intervening layer of india material. For example, 5-90% of the particles can be coated or for another example 75% of the particles can be coated, either partially or completely.

The india coated gadolinia particles and agglomerates is an enabling technology that allows the stabilization of high pressure and temperature forms of gadolinia such as hexagonal and monoclinic crystal structures. The stable room temperature form of gadolinia is a cubic crystal structure.

There is significant interest in these materials because of their unique structural, electro-optic and magneto-transport properties. Their thin films, grown either by techniques such as molecular beam epitaxy, pulsed laser deposition, or magnetron sputtering, have important applications such as in microelectronic, opto-electronic, and optical devices and also may have potential spintronic applications.

The sequioxides when doped with other rare-earth elements and transition metal ions can be used in lasers. $Gd_2O_3$ also known as gadolinia has many important applications in optics and applications involving its paramagnetic nature. Gadolinia is also used in nuclear reactors as control rods and has the advantage of reducing fuel cost and increased fuel management flexibility. It is subjected to extreme conditions of temperature and pressure and could go through phase transitions. If, however, it is synthesized in the high pressure and temperature phase, it will not go through phase changes during the cycles of variable temperature and pressure and thus prolong the durability of these rods and their breakdown.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION OF THE INVENTION

Figure 1:
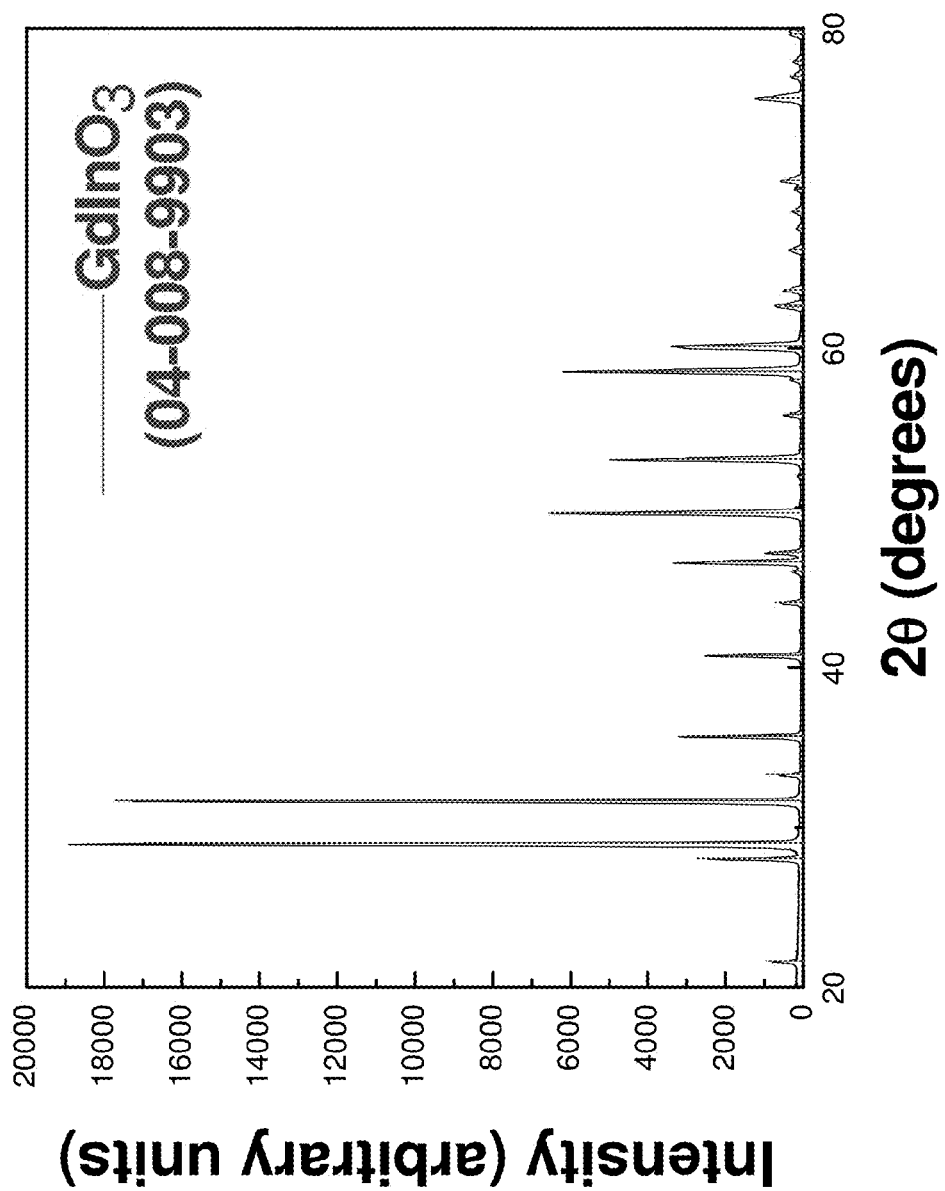
FIG. 1 is an X-ray Diffraction scan of $GdInO_3$ in hexagonal phase.
Figure 2:
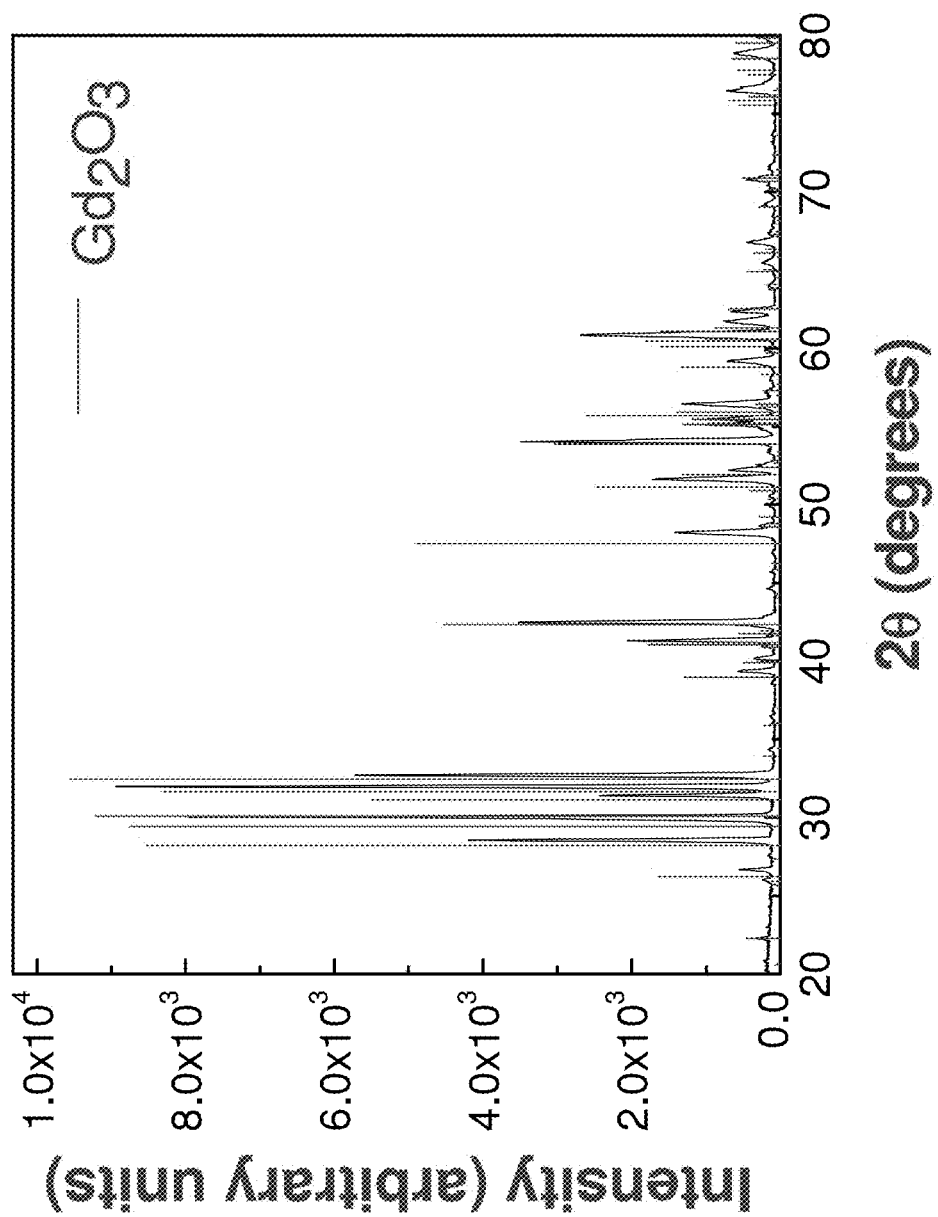
FIG. 2 is an X-ray Diffraction scan of $Gd_{0.5}In_{1.5}O_3$ in hexagonal phase.

In general, rare earth sesquioxides ($RE_2O_3$) exist in three distinct phases A, B, and C as nomenclature given by Goldschmid et al. The A phase has a hexagonal structure with the space group $P\bar{3}m1$ containing 1 molecule per unit cell, the B phase has a monoclinic structure with a space group C2/m with 6 molecules per unit cell, and the C phase is a cubic structure with a space group of $Ia\bar{3}$ with 16 molecules per unit cell.

At higher pressure, the sequence of transformation follows as C (cubic)→B (monoclinic)→A (hexagonal) with a concomitant molar volume decreasing in the same order. The shock wave studies of $Gd_2O_3$ suggested a phase transition from C→B above 4 GPa and the A phase was not reported up to 50 GPa.

Chen et al. observed that the C phase transforms to A phase above 10 GPa without going through the intermediate B phase. Similarly, Zhang et al. reported an irreversible structural transformation from the C (cubic) to a hexagonal high pressure phase between 7.0 and 15 GPa by using angular dispersive x-ray diffraction. After release of pressure, the high pressure phase transformed to a monoclinic phase.

Zou et al. reported the in situ high pressure x-ray diffraction studies in Er+ doped $Gd_2O_3$ in a diamond anvil cell up to 39.8 GPa at room temperature. They found the cubic phase transition to a hexagonal phase at 8.57 GPa and observed B (monoclinic) phase upon releasing the pressure. Thus the application of pressure during the compression cycle results in the manifestation of different polymorphs, some of which are metastable upon release of pressure.

In the case of $In_2O_3$, it has been reported that under application of high pressure a phase transition from cubic to hexagonal structure with a space group $R\bar{3}C$, where the unit cell contains six formula units.

India stabilized gadolinia is an oxide with a direct substitution of the indium ion for the gadolinia ion resulting in a compound with the formula $In_xGd_{2-x}O_3$. Indium substitutions in the range of 0.1 to 0.5 result in the stabilization of the monoclinic crystal structure while substitutions in the 0.8 to 1.2 range result in the stabilization of the pure hexagonal phase and mixture of hexagonal and cubic phases in the 1.2 to 1.8 range.

Since the precursor materials are solid inorganic particles, they must be mixed homogeneously for effective alloying. To-date, this has been accomplished by some form of mechanical mixing. However, due to the nature of particle-particle interactions, the mixture may be less than homogeneous. Inhomogeneity results in areas that have too much india and other areas that have little or no india. Coating the gadolinia particles and agglomerates overcome these traditional limitations.

The coating can be applied by spray drying, precipitation, sputtering, chemical vapor deposition, and laser deposition techniques. This list is not all inclusive and someone skilled in the art can determine additional techniques to accomplish a similar coating. The india coating can be provided by an indium compound that decomposes to india during higher temperature processing.

The mixed or coated powders can be densified by sintering or hot pressing and hot isostatic pressing (HIP) to fabricate dense shapes. Shapes having densities of 98-100% of theoretical density can be made by hot pressing at 1200-1700° C. at 0-5000 psi and then HIPing at similar temperatures with a pressure of 30,000 psi, if needed. The lower temperatures result in nano grained materials while the higher temperatures result in micro grained materials.

In addition to the high pressure polymorphism of $Gd_2O_3$, it has been used as a calibration standard for magnetometer because it exhibits a Curie-Weiss behavior and its high value of susceptibility.

This disclosure pertains to an india coating around gadolinia particles or agglomerates.

The coating ensures homogeneous distribution of india on gadolinia thereby allowing the complete conversion of the cubic room temperature and pressure gadolinia crystal structure to a high temperature and pressure hexagonal or monoclinic crystal structure.

The ceramics grain size can range from 100 nm up to 200 µm.

Example 1

The solid solutions of $In_2O_3$—$Gd_2O_3$ are prepared by mixing the two components in the desired atomic proportions and pressing the powder in a hydraulic press to form cylindrical disks with a one-inch diameter and a height of ¼ inches.

The disks were then heat treated in air for 12 hours at 1425° C. in the high-temperature ovens.

X-ray diffraction (XRD) studies were conducted to measure lattice parameters of the samples and to determine their structures. X-ray diffraction scans were taken using a Rigaku 18 kW x-ray generator and a high resolution powder diffractometer.

Example 2

The solid solutions of $In_2O_3$—$Gd_2O_3$ are prepared by coating the gadolinia particles with india derived from indium chloride dissolved in deionized water that was deposited via spray drying, heating to ≥1000 C to convert the chloride to an oxide and then heating as in Example 1 to form the solid solution.

XRD analysis confirmed formation of the monoclinic phase.

Example 3

The mixed powder from Example 1 hot pressed to 1600° C. in grafoil-lined graphite dies for 2 hours at 5000 psi resulting in a high density disk.

XRD analysis confirmed formation of the monoclinic phase.

Example 4

The coated powder from Example 2 hot pressed to 1400° C. in grafoil-lined graphite dies for 2 hours at 5000 psi resulting in a high density disk.

XRD analysis confirmed formation of the monoclinic phase.

Example 5

A hot pressed disk similar to Example 3 where LiF powder was added as a sintering aid to the mix to enhance transparency of the resulting disk.

Example 6

A hot pressed disk similar to Example 4 where LiF powder was coated onto the india-coated gadolinia powder of Example 2 to further enhance transparency of the resulting disk.

Since Gadolinia may be subjected to extreme conditions in applications such as control rods in nuclear reactors, it is quite important to have a phase that would not undergo high pressure and temperature phase transitions and remain stable. The phases that are synthesized in this invention will serve the purpose very well for nuclear reactor conditions.

Gadolinia is insulating but conducts at very high temperatures and is a good candidate for applications involving solid oxide fuel cells. However, India based Gadolinia will start conducting at lower temperature and thus the operating cost of the solid oxide fuel cell will be reduced significantly.

Gadolinia is also a good thermal insulator thus the films of india-gadolinia could be used as thermal barrier coatings and high temperature corrosion. Again, the underlying principle is that the product being used should not undergo phase transition as it is cycled through high temperatures.

Since india stabilized gadolinia is paramagnetic in nature, they are good candidates for use in medical applications such as MRI and MRA.

Because of their unique optical (high refractive index) and magnetic properties, they can be used in magneto-optic sensor applications.

India stabilized gadolinia also can be used for fluorescence and laser applications if doped with correct dopants selected from transition metal ions and rare earth ions.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A composition comprising:
   india stabilized gadolinia wherein the india stabilized gadolinia is an oxide with a direct substitution of the indium ion for the gadolinium ion resulting in a compound with the formula $In_xGd_{2-x}O_3$ and wherein the x or indium substitutions are in the range of 0.1 to 0.5 and result in a stable monoclinic crystal structure.

2. A composition comprising:
   india stabilized gadolinia wherein the india stabilized gadolinia is an oxide with a direct substitution of the indium ion for the gadolinium ion resulting in a compound with the formula $In_xGd_{2-x}O_3$ and wherein the x or indium substitutions are in the range of 1.2 to 1.8 and result in a mixture of hexagonal and cubic phases.

3. A method of making india stabilized gadolinia comprising:
   providing gadolinia particles and agglomerates;
   coating the gadolinia particles and agglomerates with india;
   producing india stabilized gadolinia; and
   mixing homogenously the india stabilized gadolinia;
   wherein the coating is by a method of one selected from the group consisting of spray drying, precipitating, sputtering, chemical vapor deposition, and laser deposition techniques.

4. The method of claim 3 wherein the india coating can be provided by an indium compound that decomposes to india during higher temperature processing.

5. The method of claim 3 further including the step of:
   fabricating dense shapes by the step of sintering or hot pressing or hot iso static pressing (HIP).

6. The method of claim 5 wherein the step of hot pressing is at a temperature of about 1200-1700° C. and a pressure of 0-5000 psi and the step of hot isostatic pressing is at a temperature of about 1200-1700° C. and a pressure of 30,000 psi and wherein the fabricated dense shapes have a density of 98-100% of theoretical density.

7. The method of claim 6 wherein the lower temperatures result in nano grained materials while the higher temperatures result in micro grained materials.

8. The method of claim 7 wherein the india stabilized gadolinia has a grain size of from 100 nm to 200 μm.

9. A method of making india stabilized gadolinia comprising:
   mixing $In_2O_3$ and $Gd_2O_3$ to form a solid powder solution; and
   pressing the solid powder solution of $In_2O_3$—$Gd_2O_3$ in a press to form a cylindrical disk with a one-inch diameter and a height of ¼ inches resulting in a compound with the formula $In_xGd_{2-x}O_3$ and wherein the x or indium substitutions are in the range of 0.1 to 0.5 and result in a stable monoclinic crystal structure.

10. The method of claim 9 further including the step of heat treating the cylindrical disk in air for 12 hours at 1425° C. in a high-temperature oven.

11. The method of claim 9 further including the steps of:
    coating the $Gd_2O_3$ particles with $In_2O_3$ derived from indium chloride dissolved in deionized water that was deposited via spray drying;
    heating to ≥1000 C to convert the chloride to an oxide;
    heating to form a solid solution; and
    resulting in a monoclinic phase.

12. The method of claim 9 further including the steps of:
    hot pressing to 1600° C. the solid powder solution in a grafoil-lined graphite die for 2 hours at 5000 psi and resulting in a high density disk with a monoclinic phase.

13. The method of claim 9 further including the steps of:
    adding LiF powder to the solid powder solution as a sintering aid to enhance transparency of the resulting high density disk; and
    hot pressing the solid powder solution containing the LiF powder.

14. The method of claim 9 further including the steps of:
    coating $In_2O_3$-coated $Gd_2O_3$ powder with LiF powder to the solid powder solution as a sintering aid to enhance transparency of the resulting high density disk; and
    hot pressing the solid powder solution containing the LiF powder.

* * * * *